(12) United States Patent
Muto et al.

(10) Patent No.: US 6,343,586 B1
(45) Date of Patent: Feb. 5, 2002

(54) CONTROL APPARATUS AND METHOD OF INTERNAL COMBUSTION ENGINE INSTALLED ON A MOTOR VEHICLE

(75) Inventors: Harufumi Muto; Makoto Fujita, both of Nishikamo-gun; Naoto Kushi, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/580,428

(22) Filed: May 30, 2000

(30) Foreign Application Priority Data

Jun. 15, 1999 (JP) .......................................... 11-168519

(51) Int. Cl.⁷ ................................................. F02P 5/15
(52) U.S. Cl. .................. 123/406.25; 123/399; 701/110
(58) Field of Search ..................... 123/406.23, 406.24, 123/406.25, 406.5, 406.51, 436, 399, 361; 701/105, 110, 111

(56) References Cited

U.S. PATENT DOCUMENTS

| | | | |
|---|---|---|---|
| 4,852,537 A | * 8/1989 | Nagano et al. ............. 123/419 |
| 4,955,346 A | * 9/1990 | Kaneyasu et al. .......... 123/399 |
| 5,070,841 A | * 12/1991 | Fujimoto et al. ........... 123/422 |
| 5,078,109 A | * 1/1992 | Yoshida et al. ............. 123/350 |
| 5,119,782 A | * 6/1992 | Kashiwabara et al. ...... 123/422 |
| 5,681,239 A | * 10/1997 | Toukura ....................... 477/107 |
| 5,931,136 A | * 8/1999 | Isobe et al. .................. 123/399 |
| 6,055,476 A | * 4/2000 | Yoshino ..................... 701/110 |
| 6,157,888 A | * 12/2000 | Suzio et al. ................. 701/110 |
| 6,246,951 B1 | * 6/2001 | Robichaux et al. ......... 701/110 |

FOREIGN PATENT DOCUMENTS

JP 114549 * 5/1989 ........... F02D/29/02

* cited by examiner

Primary Examiner—Tony M. Argenbright
Assistant Examiner—Hai Huynh
(74) Attorney, Agent, or Firm—Oliff & Berridge PLC

(57) ABSTRACT

A control apparatus of an internal combustion engine is able to effectively suppress vibration occurring upon acceleration of a motor vehicle due to an increase in the torque generated by the engine. The apparatus controls the ignition timing in accordance with variations in the acceleration of the motor vehicle, so as to variably control the torque generated by the engine. Upon the start of variable torque control, a controller controls the opening amount of the throttle valve to be larger than the opening amount originally determined depending upon the current operating conditions of the engine. As a result, the generated torque is allowed to be larger than the normally generated torque during variable torque control, and vibration upon acceleration can be effectively suppressed.

12 Claims, 9 Drawing Sheets

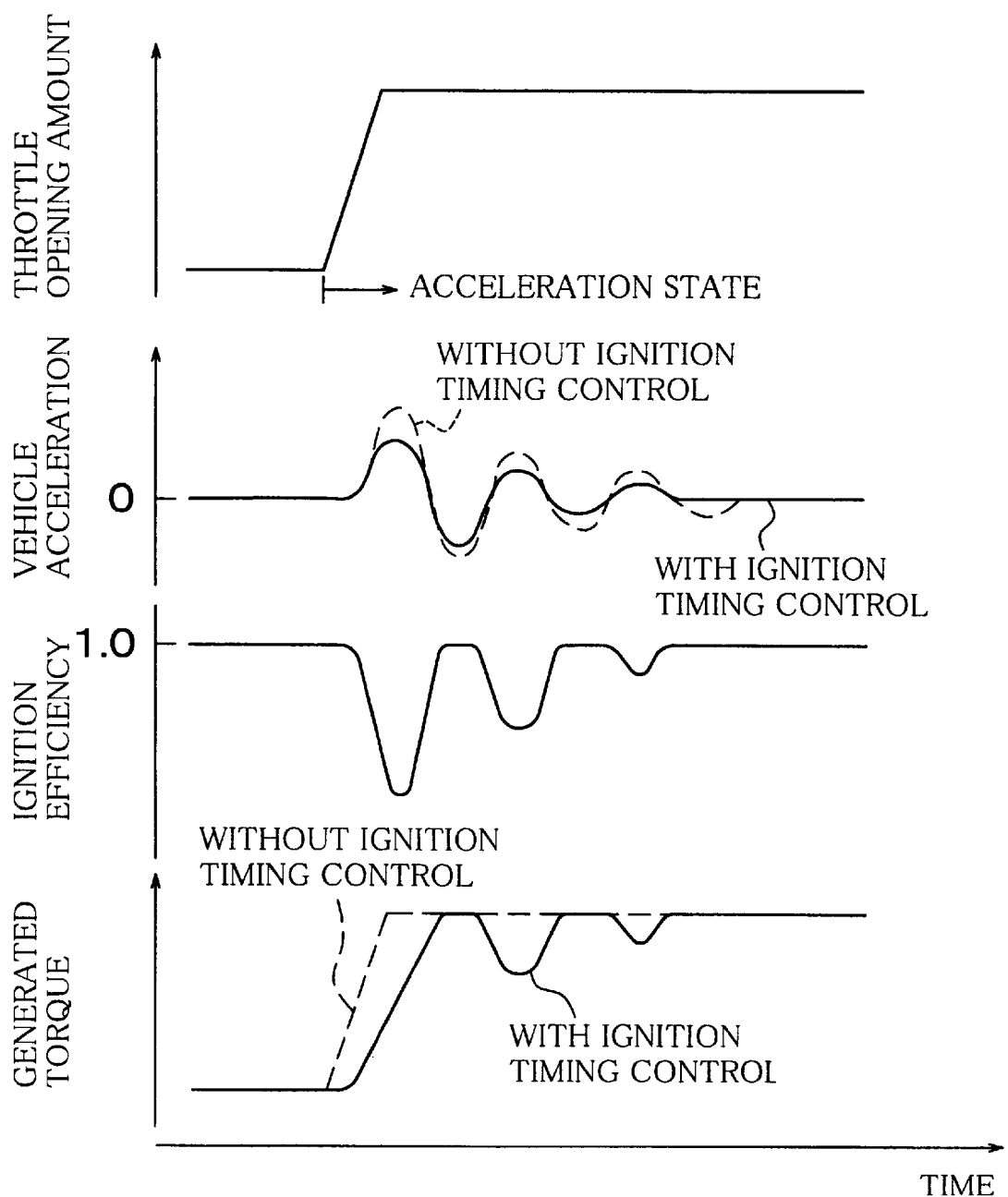

CONTROL APPARATUS AND METHOD OF INTERNAL COMBUSTION ENGINE INSTALLED ON A MOTOR VEHICLE

INCORPORATION BY REFERENCE

The disclosure of Japanese Patent Application No. 11-168519 filed on Jun. 15, 1999 including the specification, drawings and abstract is incorporated herein by reference in its entirety.

BACKGROUND OF THE INVENTION

1. Field of Invention

The present invention relates to a control apparatus and method of an internal combustion engine installed on a motor vehicle, and in particular to a control apparatus and method of a vehicle engine that controls the ignition timing so as to reduce vibration upon acceleration of the motor vehicle.

2. Description of Related Art

In internal combustion engines installed on motor vehicles, when a throttle valve is opened by a large degree in response to depression of an accelerator pedal, for example, and a torque generated by the engine is rapidly increased, "torsional strain" arises in a power transmitting system through which the output of the engine is transmitted to the drive wheels of the vehicle. As a result, "torsional vibration" occurs in the power transmitting system, due to a restoring force against the torsional strain. Immediately after the engine is brought into an acceleration operating state as a result of a change in the opening amount of the throttle valve, therefore, the acceleration varies or fluctuates in the longitudinal direction of the vehicle due to the torsional vibration. Such acceleration fluctuations at the time of acceleration of the vehicle cause vibration (vibration upon acceleration), or so-called "transient surge" or "surging", to occur in the longitudinal direction of the vehicle, which may deteriorate the driveability.

In order to alleviate or reduce the vibration upon acceleration as described above, it is known to control the ignition timing so as to vary the torque generated by the engine as needed in accordance with acceleration fluctuations at the time of acceleration of the vehicle (as disclosed in Japanese Laid-open Patent Publication No. 5-321803). FIG. 9 shows a method of controlling an internal combustion engine installed on a motor vehicle, in which such ignition timing control is performed.

When the flow rate of intake air introduced into the engine is increased (i.e., when the engine is brought into an acceleration operating state) as a result of an increase in the opening amount of a throttle valve (throttle opening amount) as shown in FIG. 9, torsional strain due to a rapid increase in the torque generated by the engine arises in the power transmitting system. As a result, the acceleration as measured in the longitudinal direction or running direction of the vehicle fluctuates as indicated by a broken line in the second graph of FIG. 9, and vibration upon acceleration occurs.

In the situation as described above, the control apparatus is adapted to control the ignition timing so that the phase of the torque generated by the engine is reversed relative to (or made opposite to) the phase of the vibration as the engine proceeds to the acceleration state. More specifically, during a period of time in which the acceleration varies to the front of the vehicle in the running direction of the vehicle, the ignition timing is delayed or lagged by reducing the ignition efficiency of the engine. During a period in which the acceleration varies to the rear of the vehicle in the vehicle running direction, the ignition timing is advanced so as to resume the ignition efficiency that has been reduced.

The graph of FIG. 9 labeled as "Generated Torque" indicates changes in the normally or naturally generated torque (broken line) when no particular control is performed, and changes in the generated torque (solid line) when the above-described control is performed. With the ignition timing controlled in the above manner, the torque generated by the engine as indicated by the solid line is reduced as compared with the normally generated torque, during a period in which the acceleration varies forward in the running direction of the vehicle, and returns to the original or normal level (broken line) during a period in which the acceleration varies rearward in the running direction of the vehicle. As a result, the fluctuations in the acceleration of the vehicle change as indicated by a solid line in the second graph of FIG. 9, and the amplitude of the fluctuations is reduced as compared with that of the fluctuations as indicated by a broken line. Consequently, the vibration upon acceleration can be reduced.

A system that variably controls the torque generated by the engine as described above utilizing control of the ignition timing at the time of acceleration of the vehicle, has a limit in the effect of reducing the vibration upon acceleration.

In the method as described above, the torque generated by the engine can be reduced with a certain degree of freedom by controlling the ignition timing, and therefore forward or positive variations in the acceleration in the running direction of the vehicle can be effectively reduced. The upper limit of the generated torque of the engine is determined by the flow rate of intake air introduced into the engine at this time. Accordingly, there is a limit to the amount of an increase in the generated torque when reducing rearward or negative variations in the acceleration in the running direction of the vehicle. It is also to be noted that the ignition timing during engine operations is generally set to such a phase that provides the highest ignition efficiency, so as to ensure a sufficiently high output efficiency of the engine. Thus, the generated torque cannot be increased to be larger than the normally generated torque, even if an attempt is made to increase the generated torque.

Also, the average value of the generated torque during the above-described variable torque control is reduced as compared with the average value of the normally generated torque. Accordingly, the acceleration performance of the vehicle may deteriorate during the variable torque control.

SUMMARY OF THE INVENTION

The present invention has been developed in light of the above-described situations. It is therefore an object of the invention to provide a control apparatus of an internal combustion engine that is able to effectively suppress vibration upon acceleration of the vehicle that occurs due to an increase in the torque generated by the engine when it is in an acceleration operating state.

To accomplish the above and/or other objects, one aspect of the invention provides a control apparatus of an internal combustion engine installed on a motor vehicle, which includes a controller. The controller determines when the engine is in an acceleration operating state in which vibration occurs. The controller also controls the output of the engine when the engine is determined to be in the acceleration operating state in a manner so as to reduce the vibration. During a period of time in which the engine is determined to be in the acceleration operating state, the controller controls an opening amount of a throttle valve provided in the engine so that the opening amount is set to a second opening amount that is larger than a first opening amount to which the opening amount would be set if the controller had not determined that the engine was in the acceleration operating state.

In the control apparatus constructed as described above, when the accelerator pedal is pressed down, and the engine is brought into an acceleration operating state, and the controller detects vibration upon acceleration that occurs due to torsional vibration of a power transmitting system of the vehicle resulting from an increase in the torque generated by the engine. During a certain period in which the vibration upon acceleration occurs, the opening amount of the throttle valve is controlled to the second opening amount that is larger than the first opening amount that is originally determined depending upon the operating state of the engine. As a result, the flow rate or specific volume of intake air introduced into the engine is increased, and the generated torque of the engine is allowed to be increased.

The above arrangement makes it possible to suppress the vibration upon acceleration of the vehicle that occurs due to an increase in the generated torque when the engine is in an acceleration operating state.

With the torque generated by the engine thus allowed to be increased, the average of the generated torque can be held at a high level, and therefore the acceleration performance of the vehicle can be maintained at a high level.

The controller may control the output of the engine so as to reduce the vibration.

In the control apparatus as described above, the controller preferably may gradually reduce the opening amount of the throttle valve from the second opening amount toward the first opening amount while the engine is determined to be in the acceleration operating state.

In the form of the invention as described just above, the rate or degree of an increase in the generated torque under the above-described control (variable torque control) is reduced as the vibration upon acceleration fades away. Accordingly, the control of varying the torque generated by the engine can be smoothly and appropriately followed by normal control.

BRIEF DESCRIPTION OF THE DRAWINGS

The foregoing and other objects, features and advantages of the invention will become apparent from the following description of preferred embodiments with reference to the accompanying drawings in which:

FIG. 9 is a timing chart showing an example of control performed by a control apparatus of an internal combustion engine installed on a motor vehicle as a related art.

DETAILED DESCRIPTION OF PREFERRED EMBODIMENTS

A control apparatus of an internal combustion engine installed on a motor vehicle according to one embodiment of the invention will be hereinafter described with reference to the accompanying drawings.

Figure 1:
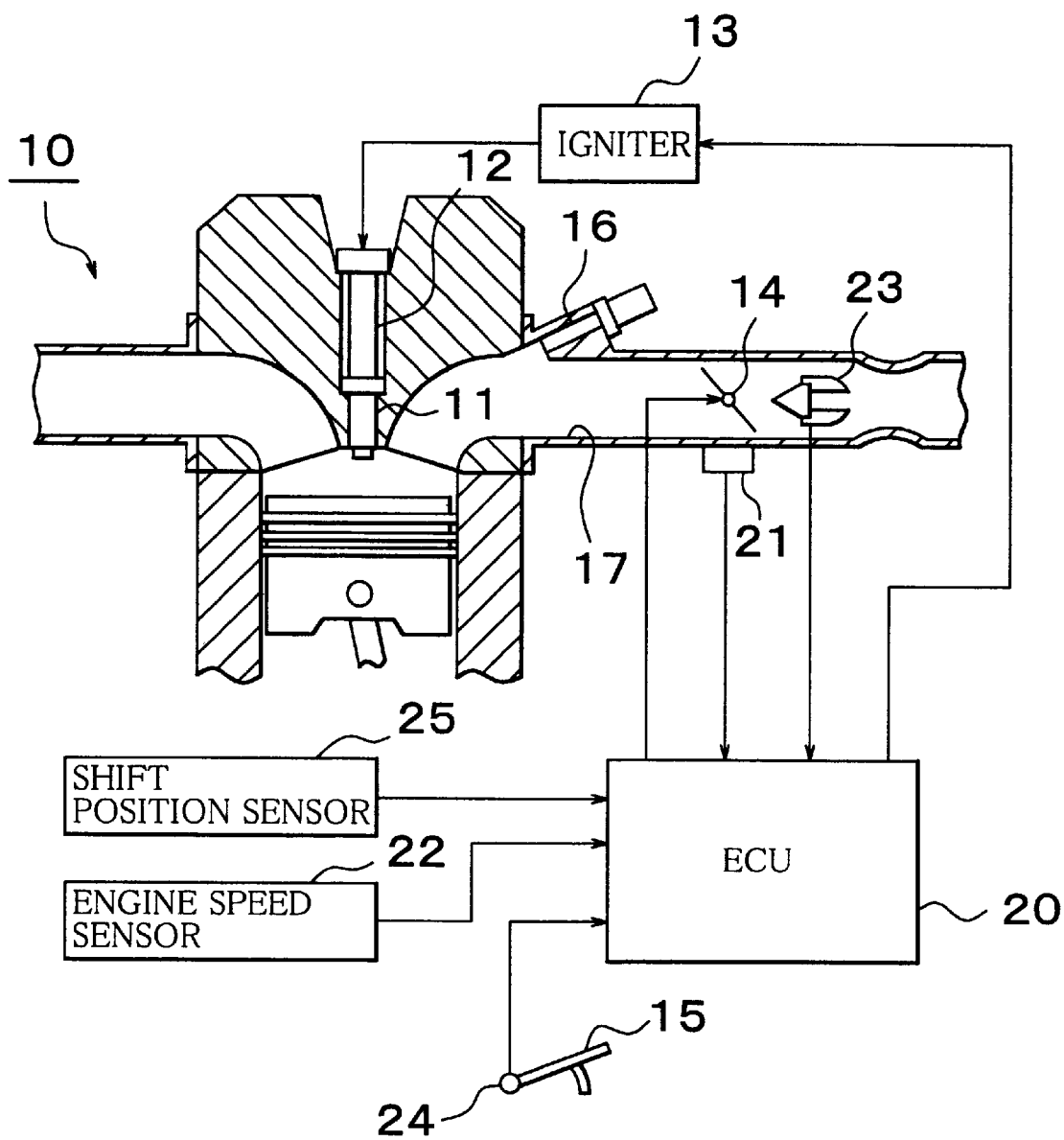
FIG. 1 is a view schematically showing the construction of a control apparatus of an internal combustion engine installed on a motor vehicle according to one embodiment of the invention.

FIG. 1 schematically shows the construction of the control apparatus of the vehicle engine of the first embodiment, and the construction of the vehicle engine.

As shown in FIG. 1, the internal combustion engine 10 installed on a motor vehicle, which employs the control apparatus of this embodiment, is a spark ignition type engine including a spark plug 11 for igniting fuel, and an ignition coil 12 for generating high-tension current required for discharge of the spark plug 11 with respect to each cylinder. The ignition coil 12 is adapted to generate high-tension current in response to an ON/OFF state of primary current supplied by an igniter 13 whose operation is controlled by an electronic control unit (hereinafter abbreviated to "ECU") 20. With an electrical discharge from the spark plug 11, a fuel ejected from a fuel injector 16 is ignited and exploded, so that the engine 10 generates a torque.

A throttle valve 14 and an air flow meter 23 are provided in an intake passage 17 of the engine 10. The throttle valve 14 serves to change an area of the opening of the intake passage 17 thereby to control the flow rate or specific volume of intake air that is introduced into the engine 10. The air flow meter 23 detects the flow rate or specific volume of the air that passes through the intake passage 17. A throttle opening amount sensor 21 is also provided for detecting the opening amount of the throttle valve 14.

The control apparatus of the present embodiment has various sensors for detecting the operating state of the engine 10, which include an engine speed sensor 22 for detecting the rotating speed of the engine 10, and an accelerator position sensor 24 for detecting the amount of depression of an accelerator pedal 15 (accelerator pedal position "pdla"), as well as the air flow meter 23 and the throttle opening sensor 21 as indicated above.

In the present embodiment, an automatic transmission is provided in a power transmitting system or a power train through which the output of the engine 10 is transmitted to drive wheels of the vehicle, and a shift position sensor 25 is provided for detecting the position of a shift lever that is to be operated for changing the gear position of the automatic transmission. The ECU 20 determines whether the engine side is operatively coupled with the wheel side for power transmission, based on a result of detection of the shift position sensor 25. Namely, the ECU 20 determines, from a result of detection of the shift position sensor 25, whether the shift lever is placed in the neutral or parking range so as to inhibit power transmission between the engine and the drive wheels, or whether the shift lever is placed in any other range so as to allow power transmission between the engine and the drive wheels.

The ECU 20 then determines the operating state of the engine 10 based on detected results of various sensors, and generates appropriate control signals to the igniter 13 and the throttle valve 14. In this manner, the ECU 20 controls ignition timing, and also controls the intake air flow rate by adjusting the opening amount of the throttle valve 14.

In order to reduce vibration upon acceleration resulting from a rapid increase in generated torque when the throttle valve 14 is opened and the engine 10 is brought into an acceleration operating state, the control apparatus of this embodiment performs "variable torque control" utilizing control of the ignition timing, and also controls the opening amount of the throttle valve 14 during variable torque control to be larger than the throttle opening amount corresponding to the operating state of the engine 10.

Figure 2:
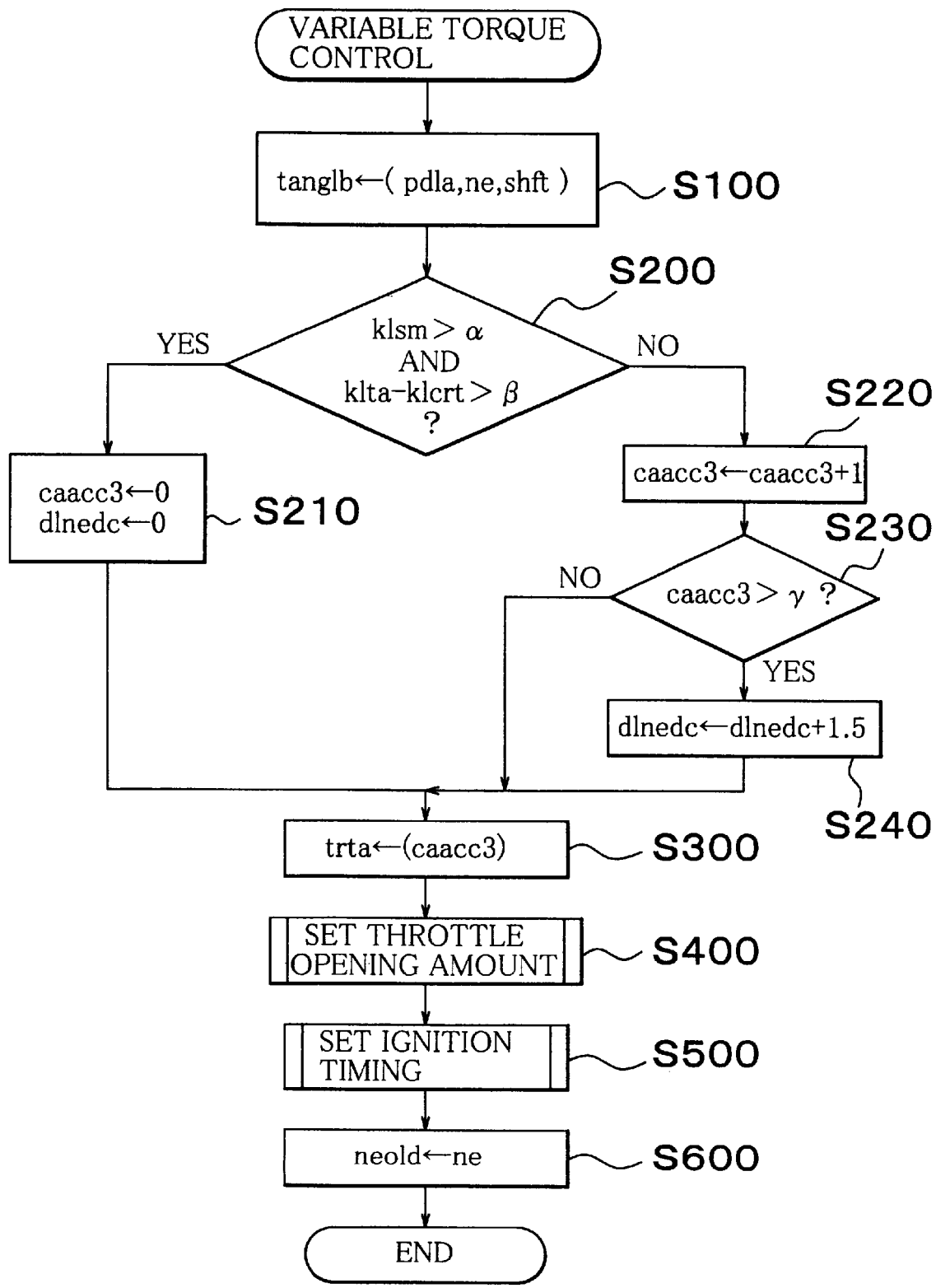
FIG. 2 is a flowchart showing a control routine of variable torque control.

FIG. 2 is a flowchart showing a control routine associated with variable torque control of this embodiment. The ECU 20 repeatedly executes the control routine shown in FIG. 2 at regular time intervals, so as to calculate a target value of the opening amount of the throttle valve 14 (final target throttle opening amount "tangle") and the ignition timing "aopa". Referring to FIG. 2, the variable torque control performed by the control apparatus of this embodiment will be described in detail.

In step S100, the ECU 20 initially calculates a base target throttle opening amount "tanglb" as a target value of throttle opening determined based on the current operating conditions or state of the engine 10. Namely, the base target throttle opening amount "tanglb" is a target value of throttle opening that is obtained solely from the operating state of the engine 10. In this embodiment, the base target throttle opening amount "tanglb" is calculated based on the accelerator pedal position (the amount of depression of the accelerator pedal) detected by the accelerator position sensor 24, engine speed "ne" detected by the engine speed sensor 22, and the shift position "shft" detected by the shift position sensor 25.

After calculating the base target throttle opening amount "tanglb", the ECU 20 determines in the next step S200 whether conditions appropriate for starting variable torque control are established. In this embodiment, if the following two conditions (A) and (B) are both satisfied, the ECU 20 determines that the conditions appropriate for starting variable torque control are established.

(A) The torque generated by the engine 10 is increasing to be larger than a certain value.

(B) The rate of change in the currently detected throttle opening amount is rapidly increasing to be larger than a certain ratio.

More specifically, the condition (A) is determined as being established or satisfied when a change "klsm" in the intake air flow rate detected by the air flow meter 23 is larger than a predetermined value $\alpha$.

The condition (B) is determined based on the amount of a response delay in the flow rate of the intake air introduced into the engine 10, with respect to a change in the throttle opening amount. The amount of a response delay in the intake air flow rate is obtained in the following manner.

Initially, two estimated values of the intake air flow rate, i.e., a steady-state air flow rate "klta" and a transient air flow rate "klcrt" are calculated from the throttle opening amount detected in the current cycle. The steady-state air flow rate "klta" is an estimated value of the intake air flow rate when the engine 10 is held in a steady or stable state with the throttle opening amount being kept at the current value. The steady-state air flow rate "klta" is obtained solely from the throttle opening amount and the engine speed "ne".

The transient air flow rate "klcrt is an estimated value of the intake air flow rate that is calculated in view of an influence of response delay relative to a change in the throttle opening amount, in addition to the above parameters. In fact, the flow rate of the intake air introduced into the combustion chamber does not immediately reflect or follow the current throttle opening amount upon a change of the throttle opening amount, due to the time required for the air to flow from the throttle valve to the combustion chamber. Thus, the flow rate of the air that is actually introduced into the engine 10 at this time is estimated from changes in the throttle opening amount and the engine speed, and calculated as a transient air flow rate "klcrt". The transient air flow rate "klcrt" is obtained according to the following expression (1):

$$klcrt(i)=(klta(i)-klcrt(i-1))\times \text{<time constant>}+klcrt(i-1) \quad (1)$$

where klcrt(i): transient air flow rate calculated in the current cycle klta(i): steady-state air flow rate calculated in the current cycle klcrt(i−1): transient air flow rate calculated in the previous cycle In the above-indicated expression (1), the time constant is determined depending upon the operating state of the engine 10 so as to provide an appropriate transient air flow rate "klcrt". In this embodiment, the time constant is set based on the current steady-state air flow rate "klta" and the engine speed "ne".

Figure 3:
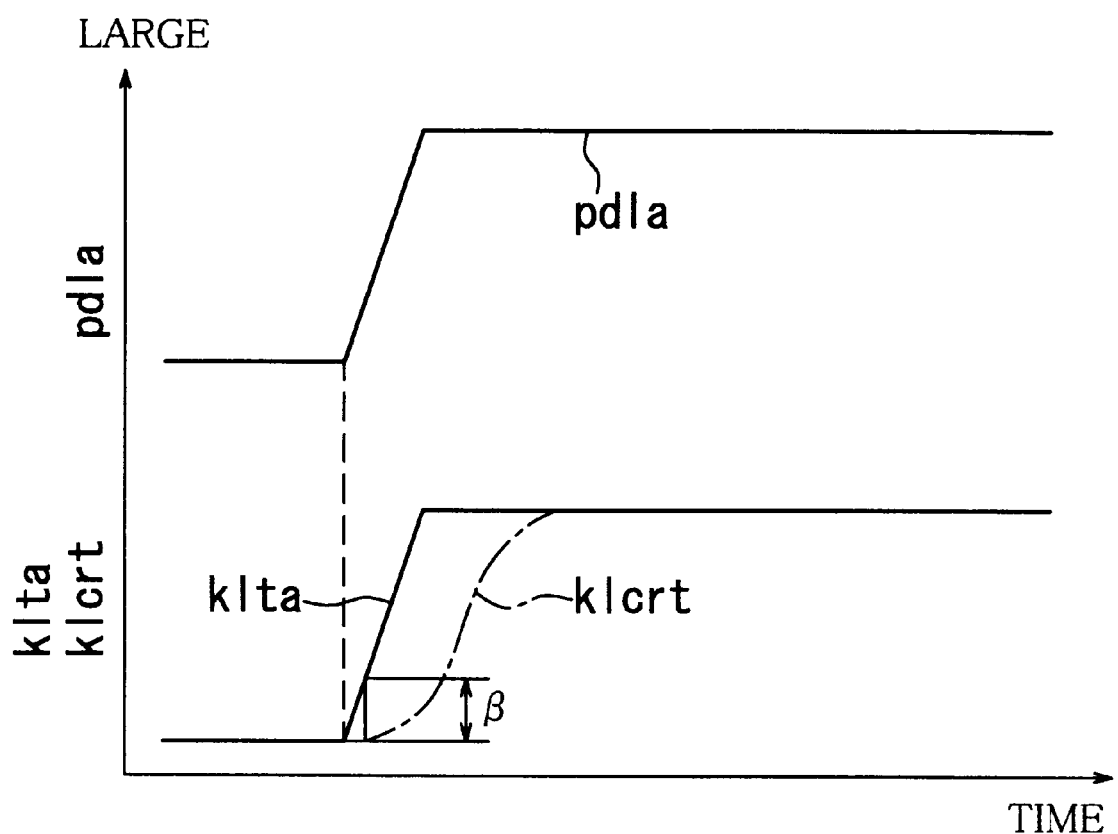
FIG. 3 is a timing chart showing changes in estimated values of the accelerator pedal position and intake air flow rate.

FIG. 3 shows changes in the accelerator pedal position or depression amount "pdla" and changes in the steady-state air flow rate "klta" and transient air flow rate "klcrt" resulting from the change in the accelerator pedal position "pdla". As shown in FIG. 3, the steady-state air flow rate "klta" increases almost synchronously with the accelerator depression amount "pdla". On the other hand, the transient air flow rate "klcrt" does not immediately follow the accelerator depression amount "pdla", but increases with a slight delay. By comparing the steady-state air flow rate "klta" with the transient air flow rate "klcrt" at this time, therefore, the ECU 20 can determine whether the engine 10 is operating in a steady state or in a transient state (for example, when proceeding to an acceleration operating state).

In this embodiment, therefore, a difference between the steady-state air flow rate "klta" and the transient air flow rate "klcrt" (klta−klcrt) is used as a criteria for determining the above-described condition (B). If the difference (klta−klcrt) is larger than a certain value $\beta$, the ECU 20 determines that the engine 10 has been brought into an acceleration operating state.

As described above, the transition of the engine 10 to the acceleration operating state can be accurately and promptly determined on the basis of a response delay of the intake air flow rate relative to a change in the throttle opening amount. By obtaining a degree of the response delay using an estimated value of the intake air flow rate calculated based on the current throttle opening amount and engine speed, the transition of the engine to the acceleration operating state can be further accurately and promptly determined irrespective of an influence of a response delay of the air flow meter 23, etc.

In the manner described above, this embodiment determines whether the conditions of starting variable torque control are established.

If the ECU 20 determines that the conditions of starting variable torque control are satisfied ("YES" is obtained in step S200), the control flow proceeds to step S210 to set values of a counter "caacc3" and convergence factor "dlnedc" to zero. The value of the counter "caacc3" represents the lapsed time from the start of variable torque control. The convergence factor "dlnedc" is a variable used for converging a variable amount of the generated torque of the engine 10 to be controlled, so that the variable torque control smoothly finishes at a point in time when a certain period of time elapses from the start of the control. After executing the step S210, the ECU 20 proceeds to the operation of step S300.

Where the conditions of starting the variable torque control are not satisfied ("NO" is obtained in step S200), namely, where variable torque control has not yet been started or has been already executed, on the other hand, the ECU 20 proceeds to step S220. In step S220, the ECU 20 adds "1" to the value of the counter "caacc3".

In the following step S230, the ECU 20 determines whether it is the time to converge a variable amount of the generated torque of the engine 10 under variable torque control, based on the value of the counter "caacc3", namely, whether the current cycle is in a convergence period of variable torque control. If the value of the counter caacc3 is larger than a predetermined value γ in this step, the ECU 20 determines that the current control cycle is within a convergence period.

If the current cycle is not within a convergence period ("NO" is obtained in step S230), the ECU 20 proceeds to step S300 while keeping the convergence factor "dlnedc" at zero (as described above, the value of "dlnedc" is set to zero upon the start of the variable torque control).

If the current cycle is within a convergence period ("YES" is obtained in step S230), on the other hand, step S240 is executed to add "1.5" to the convergence factor "dlnedc", and the ECU 20 then proceeds to step S300.

Figure 4:
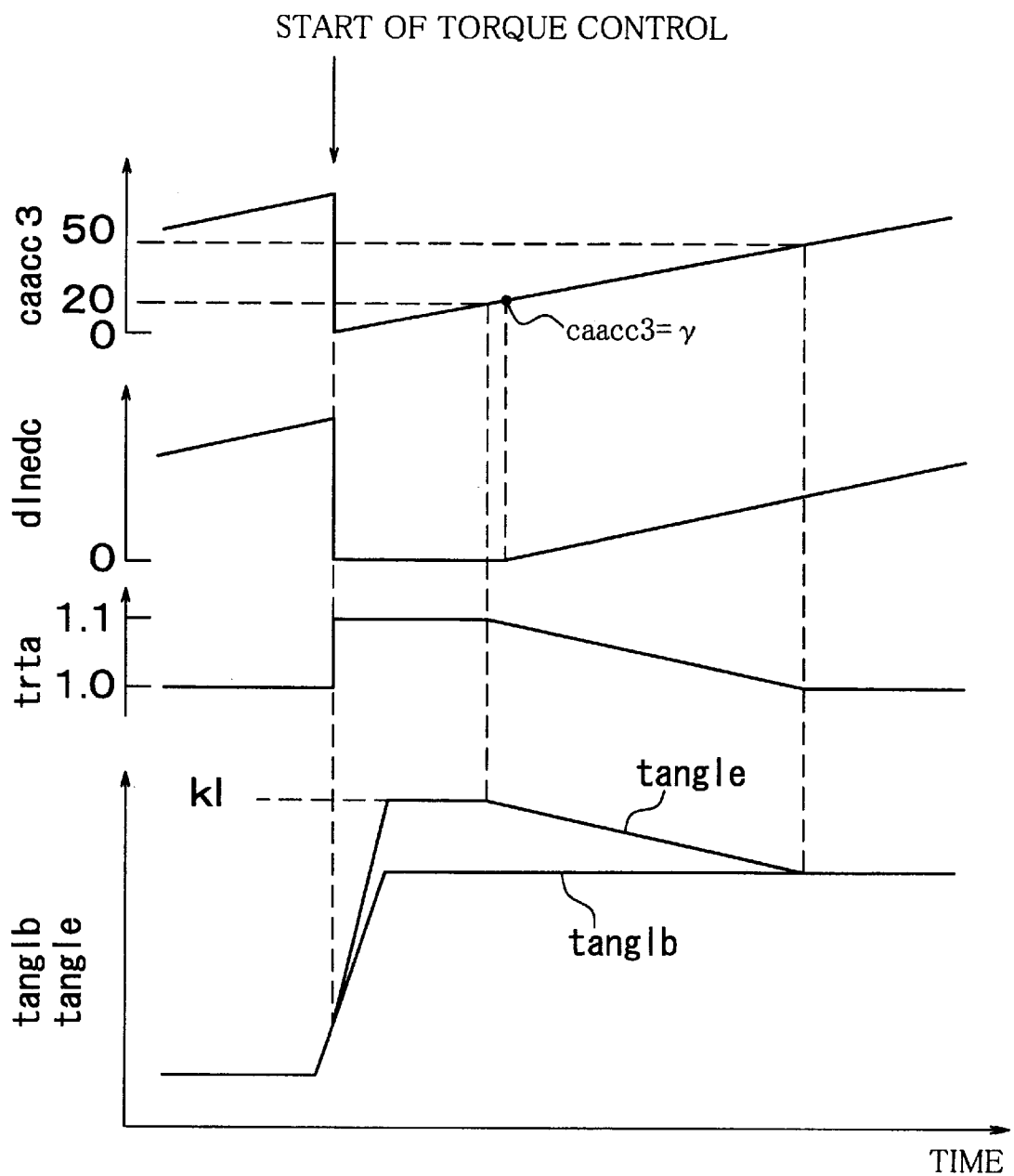
FIG. 4 is a timing chart showing an example of control according to the invention.

As a result of the operations of steps S200–S240, the values of the counter "caacc3" and convergence factor "dlnedc" change with time as shown in FIG. 4.

Referring to FIG. 4, the value of the counter "caacc3" is set to zero at a point in time when the base target throttle opening "tanglb" suddenly increases, and the conditions of starting variable torque control are established. The counter value "caacc3" is then incremented by "1" each time one cycle of the variable torque control routine is executed.

Similarly, the convergence factor "dlnedc" is set to zero upon the start of the variable torque control, as in the case of the counter "caacc3". The convergence factor "dlnedc" is then maintained at zero until the counter value "caacc3" becomes equal to a predetermined value γ. Once the counter value "caacc3" becomes larger than γ, "1.5" is added to the convergence factor "dlnedc" each time one cycle of the variable torque control routine is executed.

The ECU 20 executes step S300 after setting the counter "caacc3" and the convergence factor "dlnedc" in steps S200–S240 in the flowchart of FIG. 2.

In step S300, the ECU 20 calculates a base target torque multiplying factor "trta" depending upon the value of the counter "caacc3". The base target torque multiplying factor "trta" is set as a multiplying factor of "the upper limit value of the variable rate of the generated torque under variable torque control" with respect to "the maximum generated torque at the base target throttle opening "tanglb" determined depending upon the operating state of the engine 10".

Thus, the base target torque factor "trta" changes with time as shown in FIG. 4. In this embodiment, the base target torque multiplying factor "trta" is set to "1.1" at the same time that the conditions of starting the variable torque control are established. The base target torque multiplying factor "trta" is then maintained at "1.1" until the counter "caacc3" becomes equal to a first predetermined value (caac3=20 in this example). Thereafter, the base target torque multiplying factor "trta" is gradually reduced toward "1.0". Once the counter "caacc3" becomes equal to a second predetermined value (caacc3=50 in this example), the base target torque multiplying factor "trta" is maintained at "1.0".

In the control apparatus as described above, variable torque control is performed such that the generated torque may be increased to be 1.1 times as much as the normally generated torque that is determined based on the operating state of the engine 10 during a first predetermined period of time measured from the start of the control. During a second predetermined period of time following the first predetermined period, the base target torque multiplying factor "trta" is set so as to gradually limit the increase of the generated torque.

After setting the base target torque multiplying factor "trta" in the above manner, the ECU 20 proceeds to step S400 to set a throttle opening amount based on the base target torque multiplying factor "trta". Here, the throttle opening amount is set so as to allow "an increase in the generated torque" corresponding to the base target torque (multiplying, scale) factor set in the previous step.

Figure 5:
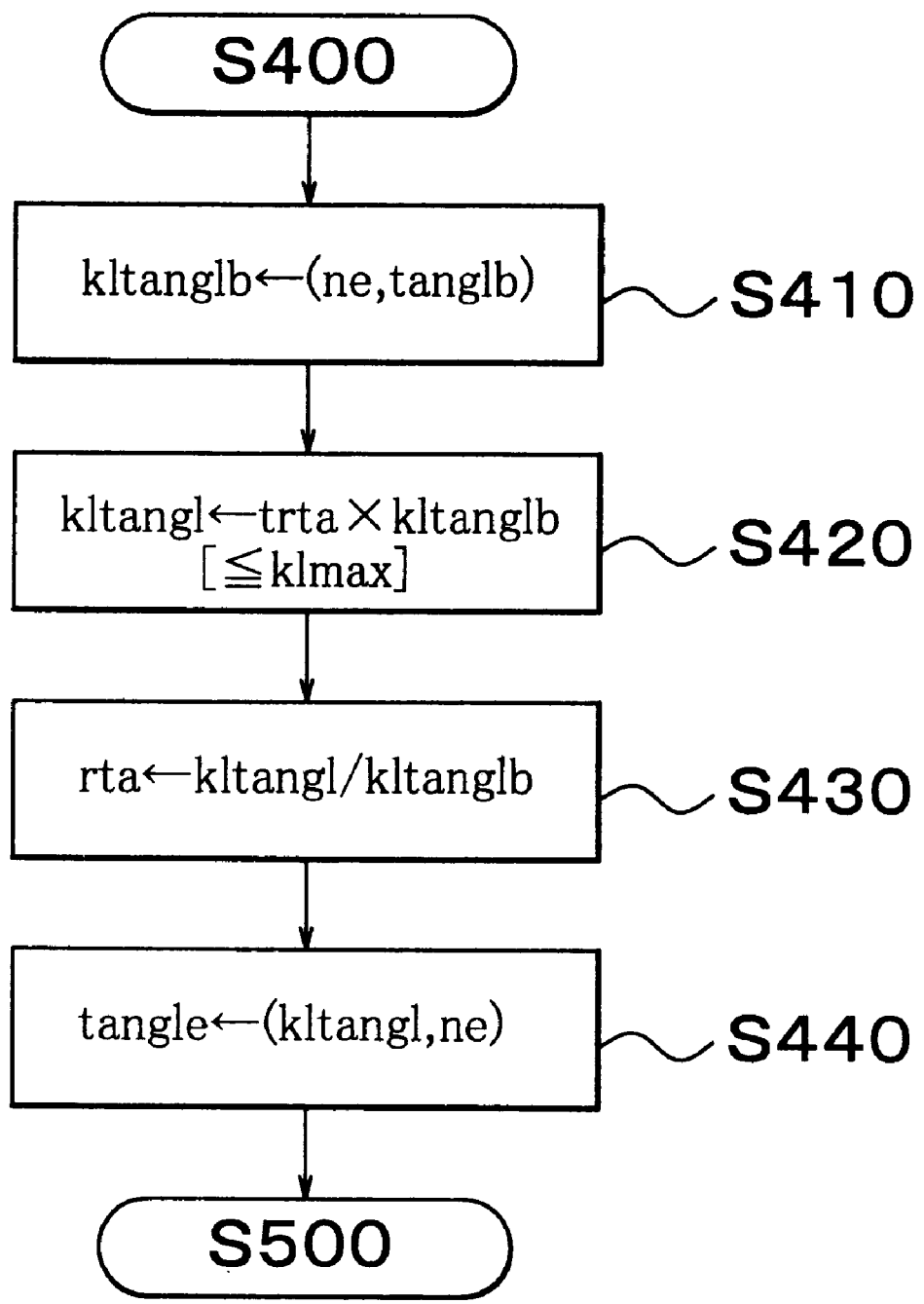
FIG. 5 is a flowchart showing a process of setting the throttle opening amount under variable torque control.

FIG. 5 shows the control routine to be executed by the ECU 20 for setting the throttle opening amount. A method of setting the throttle opening amount will be described in detail referring to FIG. 5.

In step S410, the ECU 20 calculates a base target air flow rate "kltanglb" as an air flow rate that corresponds to the current operating state or conditions of the engine 10 (namely, when variable torque control is not carried out), based on the base target throttle opening amount "tanglb" and the engine speed "ne" set in the previous step S100 (FIG. 2). The base target air flow rate "kltanglb" indicates the magnitude of generated torque that corresponds to the operating conditions of the engine 10 that were determined in step S100.

The ECU 20 then proceeds to step S420 to calculate a final target air flow rate "kltangl" by multiplying the base target air flow rate "kltanglb" by the base target torque multiplying factor "trta". The final target air flow rate "kltangl" is an intake air flow rate that can permit "an increase in the generated torque" according to the base target torque multiplying factor "trta" set in the previous step, during execution of variable torque control.

It is, however, to be noted that there is a limit to the flow rate of the intake air that can be introduced into the engine 10 even if the throttle valve is fully opened. Therefore, the final target air flow rate "kltangl" is limited by an upper-limit guard air flow rate "klmax" that is calculated based on the engine speed "ne", for example.

After calculating the final target air flow rate "kltangl", the ECU 20 proceeds to step S430 to set the ratio of the final target air flow rate "kltangl" to the base target air flow rate "kltanglb" (kltangl/kltanglb) as a final target torque multiplying factor "rta". Namely, the final target torque multiplying factor "rta" indicates the multiplying factor by which the generated torque actually can be increased with the throttle opening amount set in step S400.

In step S440, the BCU 20 calculates a final target throttle opening amount "tangle" based on the final target air flow rate "kltangl" and the engine speed "ne". The final target throttle opening amount "tangle" is obtained as a throttle opening amount that can ensure the intake air flow rate corresponding to (or matching) the final target air flow rate "kltangl" calculated in the previous step S420. The ECU 20 then controls driving of the throttle valve 14 based on the final target throttle opening amount "6tangle".

FIG. 4 shows changes in the throttle opening amount with time during the variable torque control as described above.

Referring to FIG. 4, a method of controlling driving of the throttle valve 14 in this embodiment will be now explained.

When the accelerator pedal 15 is pressed down, and the conditions of starting variable torque control are satisfied, the counter "caacc3" is cleared (set to zero), and at the same time the base target torque multiplying factor "trta" is set to 1.1. At this time, the final target throttle opening amount "tangle" is substantially equivalent to the actual throttle opening amount, and then is increased to be larger than the base target throttle opening amount "tanglb" so as to permit "an increase in the generated torque" in accordance with the base target torque multiplying factor "trta", as long as it is not limited by the upper-limit guard air flow rate "klmax".

The final target throttle opening amount "tangle" is kept larger than the base target throttle opening amount "tanglb" during the first predetermined period until the counter value "caacc3" becomes equal to 20, as long as it is not limited by the upper-limit guard air flow rate "klmax", while maintaining the same ratio of the final target throttle opening amount "tangle" to the base target throttle opening amount "tanglb". When the counter value "caacc3" becomes equal to 20, the ratio of the final target throttle opening amount "tangle" to the base target throttle opening amount "tanglb" is gradually reduced during the second predetermined period until the counter value "caacc3" becomes equal to 50. After "caacc3" becomes equal to 50, the final target throttle opening amount "tangle" is made equal to the base target throttle opening amount "tanglb".

In the control apparatus of this embodiment, the opening of the throttle valve 14 is controlled to be larger than the opening (i.e., base target throttle opening amount "tanglb") that is determined based on the current operating state of the engine 10, upon the start of the variable torque control. In this manner, the torque actually generated by the engine 10 is allowed to be larger than the normally generated torque of the engine 10, under variable torque control that is executed when the engine 10 is brought into an acceleration operating state. Since the throttle opening amount is controlled so as to gradually approach the opening amount normally determined based on the operating state of the engine after keeping the rate of increase in the opening (the ratio of the final target throttle opening amount to the base target throttle opening amount) at the same value for a certain period of time, the transition from variable torque control to ordinary or normal control can be smoothly accomplished.

Figure 6:
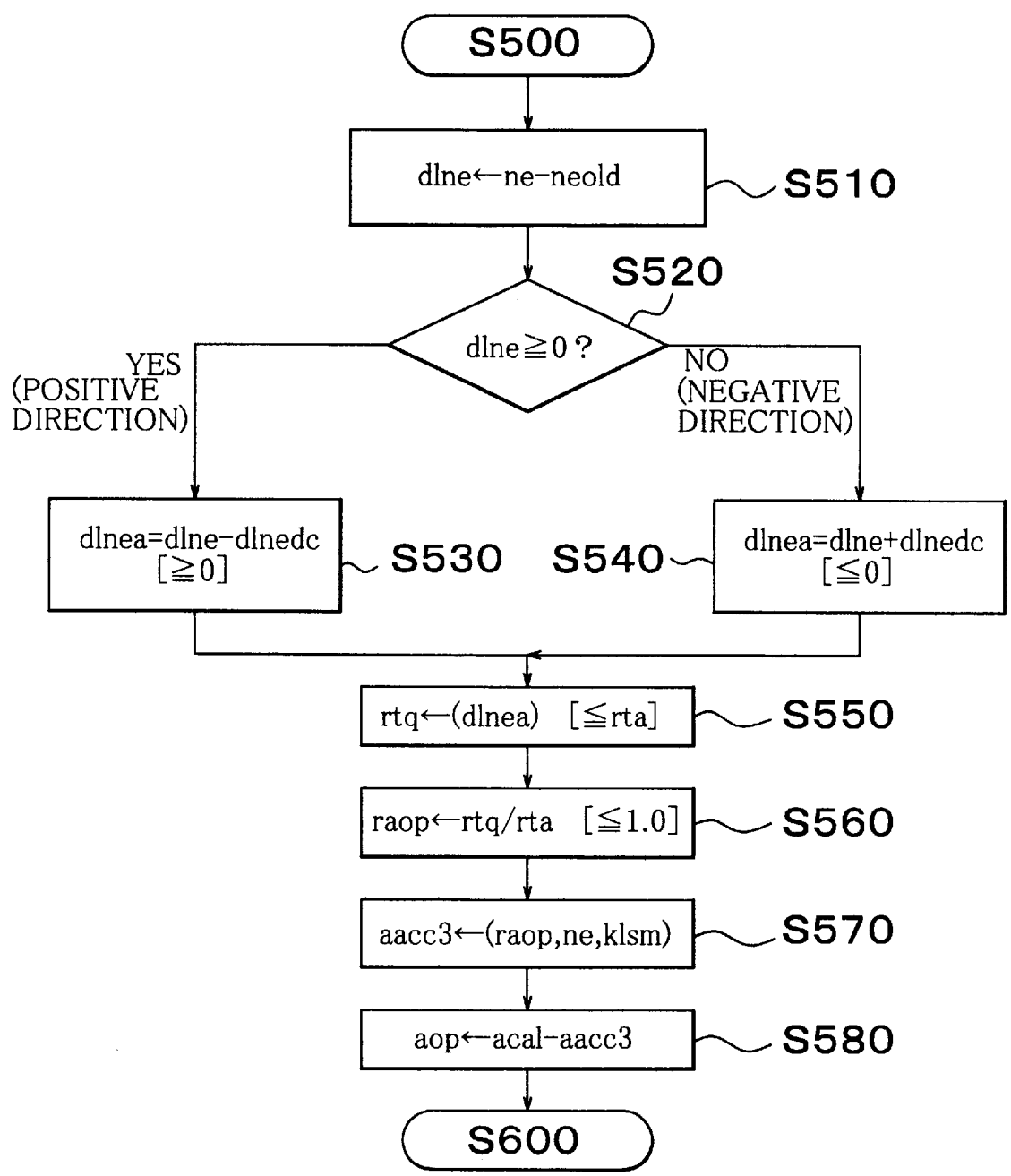
FIG. 6 is a flowchart showing a process of setting the ignition timing under variable torque control.

After setting the throttle opening amount as described above (steps S410–S440 in FIG. 5), the ECU 20 proceeds to step S500 of FIG. 2 to set the ignition timing. Here, the ignition timing is set to variably control the torque generated by the engine 10, in order to reduce vibration upon acceleration of the vehicle. FIG. 6 shows a control routine to be executed by the ECU 20 for setting the ignition timing. Referring to FIG. 6, a method of setting the ignition timing in this embodiment will be now explained.

The ECU 20 initially executes step S510 to calculate a variation "dlne" in the engine speed "ne". Here, a difference between the engine speed "ne" in the current cycle and the engine speed "neold" detected in the previous cycle of the variable torque control (which will be referred to as "last engine speed") is calculated as a variation "dlne".

In the control apparatus of this embodiment, the direction and magnitude of a variation in the acceleration of the vehicle due to vibration upon acceleration are basically determined on the basis of the variation "dlne" in the engine speed, and the ignition timing is set so as to vary the generated torque as needed according to the results of this determination. It is, however, to be noted that the rate of variation in the generated torque is calculated so that the variation in the torque generated by the engine 10 under variable torque control converges, i.e., becomes equal to zero, at an appropriate point in time. A modified engine speed variation "dlnea" calculated in the following steps S520–S540 is used as a basis for calculating the rate of variation in the generated torque.

In steps S520–S540, the ECU 20 obtains a modified engine speed variation "dlnea" by reducing the absolute value of the actual variation "dlne" by an amount of the convergence factor "dlnedc" (calculated in step S240 of FIG. 2). More specifically, the ECU 20 determines in step S520 whether the actual variation "dlne" is a positive value or a negative value (namely, whether the engine speed "ne" is increasing or decreasing). If the engine speed "ne" is increasing (dlne≧0), a value (larger than zero: positive value) obtained by subtracting the convergence factor "dlnedc" from the variation "dlne" is set as a modified engine speed variation "dlnea" in step S530. If the engine speed "ne" is decreasing (dlne<0), a value (smaller than zero: negative value) obtained by adding the convergence factor "dlnedc" to the variation "dlne" is set as a modified engine speed variation "dlnea" in step S540.

In the next step S550, the ECU 20 calculates a target torque variation rate "rtq" as a target value of the rate of variation in the generated torque, based on the modified engine speed variation "dlnea" calculated in step S530 or S540. Here, the rate of variation in the generated torque means the ratio of the generated torque that is made variable under variable torque control, to the generated torque normally determined based on the operating state of the engine 10.

Figure 7:
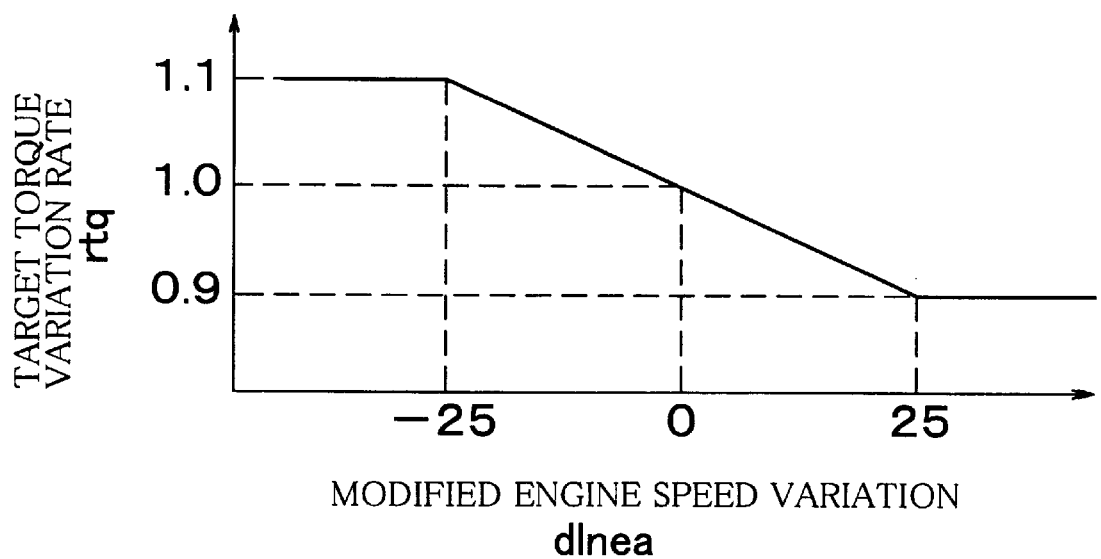
FIG. 7 is a graph showing the relationship between the modified engine speed variation and the target torque variation rate.

The target torque variation rate "rtq" may be obtained from a map of FIG. 7. As shown in FIG. 7, when the modified engine speed variation "dlnea" is equal to zero, the value of the target torque variation rate "rtq" is set to 1.0. When "dlnea" is larger than zero (dlnea>0), the value of "rtq" is set to be reduced with an increase in the absolute value of "dlnea". When "dlnea" is smaller than zero (dlnea<0), on the other hand, the value of "rtq" is set to be increased with an increase in the absolute value of "dlnea".

To restrict the variable range of the generated torque of the engine 10, the target torque variation rate "rtq" is set to 0.9 when the modified engine speed variation "dinea" is equal to or greater than 25, and "rtq" is set to 1.1 when "dlnea" is equal to or smaller than −25, irrespective of the magnitude of the absolute value of "dlnea". Furthermore, the target torque variation rate "rtq" is also restricted by the final target torque multiplying factor "rta" obtained in step S430 (FIG. 5).

Subsequently, the ECU 20 proceeds to step S560 to calculate an ignition efficiency "raop" (the ratio of the target torque variation rate "rtq" to the final target torque multiplying factor "rta") according to the target torque variation rate "rtq" calculated in step S550.

After obtaining the ignition efficiency "raop", the ECU 20 executes step S570 to calculate a phase correction amount "aacc3" of the ignition timing, based on the ignition efficiency "raop", engine speed "ne", and change "klsm" in the intake air flow rate detected by an air flow meter 23. In the next step S580, the phase obtained by adjusting the base ignition timing "acal" in which the ignition efficiency is maximized ("raop"=1.0) in the current operating state of the engine 10 with a lag or delay of the phase correction amount "aacc3" is set as the final ignition timing "aop" to be used in the actual operation of the engine 10.

Thus, the control apparatus of the present embodiment sets the ignition timing so that the generated torque is adjusted as needed depending upon variations "dlne" in the engine speed.

After setting the ignition timing, the ECU 20 executes step S600 (FIG. 2) to update the last engine speed "neold" used for calculation of the variation "dlne" in the engine speed in step S510, and the current control cycle is finished.

Figure 8:
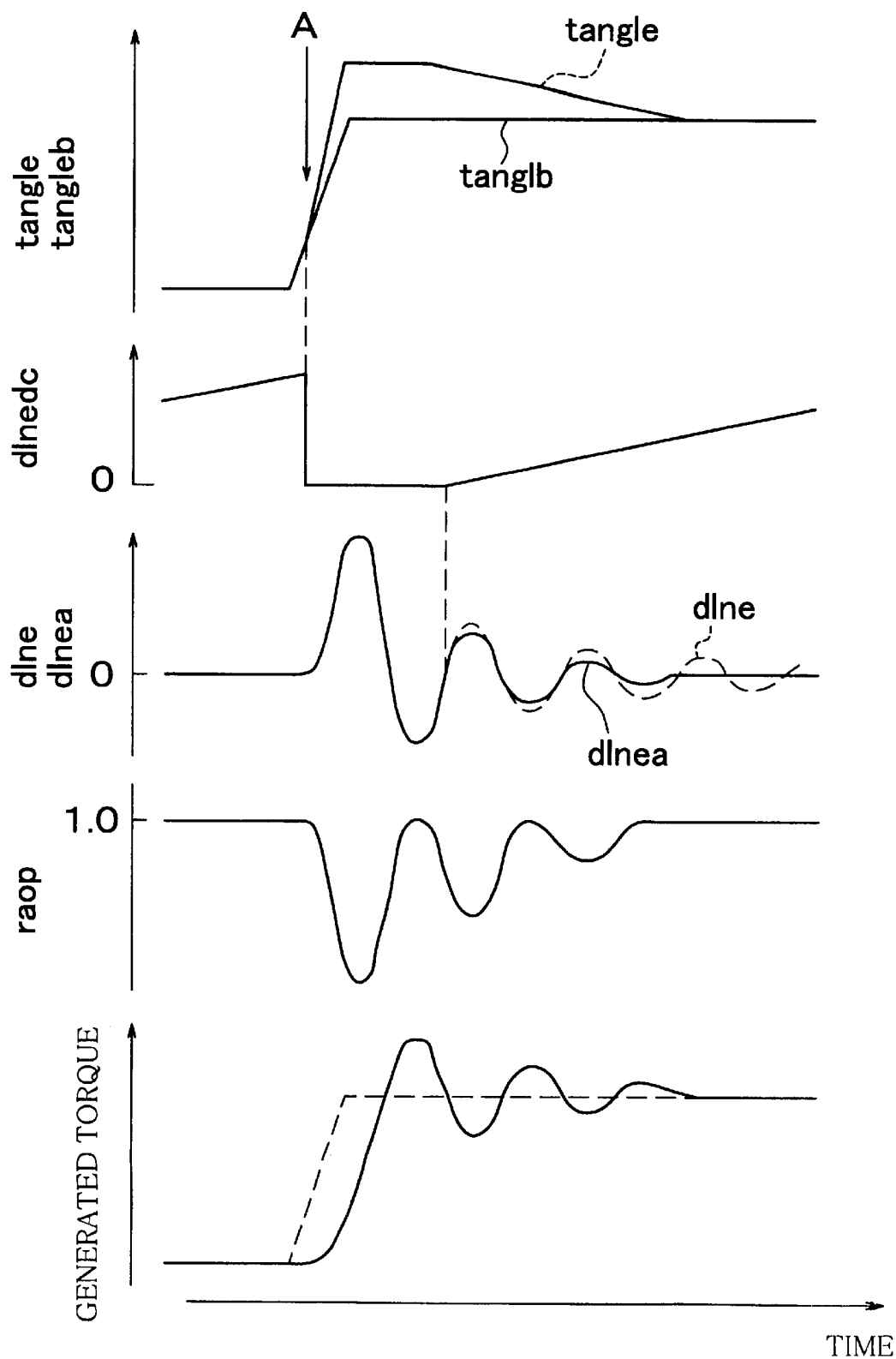
FIG. 8 is a timing chart showing an example of control according to the invention.

FIG. 8 is a time chart showing an example of variable torque control performed according to the control routine as explained above.

As described above, when the accelerator pedal 15 is pressed down, and the conditions of starting variable torque control are established (at a point in time A in FIG. 8), the final target throttle opening amount "tangle" is set to be larger than the base target throttle opening amount "tanglb" that is determined depending upon the operating state of the engine 10. As a result, the flow rate or specific volume of the intake air introduced into the engine 10 is increased, and the engine 10 is allowed to generate a torque that is larger than a normally generated torque that depends upon the operating state of the engine.

Upon the start of the variable torque control, the convergence factor "dlnedc" is set to zero. The convergence factor "dlnedc" is then gradually increased after being maintained at zero for a certain period of time.

When the engine 10 is brought into an acceleration operating state in response to depression of the accelerator pedal 15, the acceleration of the vehicle fluctuates due to torsional vibration of the power transmitting system or power train. As a result, the engine speed is increased when the acceleration varies to the front in the longitudinal or running direction, and is reduced when the acceleration varies to the rear in the running direction of the vehicle. A broken line in the third graph of FIG. 8 indicates changes in the amount of variation "dlne" in the engine speed after the engine is brought into the acceleration operating state.

In the control apparatus, the modified engine speed variation is obtained by subtracting the convergence factor "dlnedc" from the engine speed variation "dlne". A solid line in the third graph of FIG. 8 indicates changes in the modified engine speed variation "dlnea". The control apparatus then sets the target torque variation rate "rtq" of the engine 10 associated with variable torque control, based on the modified engine speed variation "dlnea", and calculates the ignition efficiency "raop" in accordance with the target torque variation rate "rtq".

As shown in FIG. 8, when the modified engine speed variation "dlnea" is a negative value, namely, when the engine speed is decreasing, the ignition efficiency "raop" is set to a large value so that the torque generated by the engine 10 is increased. When the modified engine speed variation "dlnea" is a positive value, namely, when the engine speed is increasing, the ignition efficiency "raop" is set to a small value so that the torque generated by the engine 10 is reduced.

Consequently, the torque generated by the engine 10 is reduced upon an increase in the engine speed, and increased upon a decrease in the engine speed, as indicated by a solid line in the graph at the bottom of FIG. 8. Furthermore, the throttle opening amount (tangle) at this time is controlled to be larger than the opening amount (tanglb) that was originally determined depending upon the operating state of the engine 10, and the generated torque is allowed to be larger than the normally generated torque corresponding to the operating state of the engine 10 as indicated by a broken line in FIG. 8.

Therefore, the generated torque may be increased to be larger than the normally generated torque upon a decrease in the engine speed, thus effectively preventing the engine speed from being lowered. Consequently, vibration upon acceleration that occurs when the engine is brought into an acceleration operating state can be effectively suppressed.

Furthermore, the generated torque is not only reduced but also increased as compared with the normally generated torque during variable torque control, and therefore a reduction in the average torque during the control procedure can be favorably limited or avoided. During variable torque control, therefore, the average torque generated by the engine 10 can be maintained at a high level, and the acceleration performance of the vehicle can be thus kept at a high level.

Since the convergence factor "dlnedc" increases with time, the value of the modified engine speed variation "dlnea" is gradually reduced to zero, and the ignition timing will not be changed even with variations in the engine speed. Thus, upon a lapse of a certain period of time from the start of the control, the variable torque control smoothly switches over to normal control of ignition timing.

As explained above, the control apparatus of the vehicle engine of the invention controls the opening amount of the throttle valve 14 to be larger than the throttle opening amount originally determined depending upon the current operating conditions of the engine, during variable torque control performed so as to reduce vibration upon acceleration that occurs when the engine 10 is brought into an acceleration operating state. With the variable torque control, therefore, the generated torque may be increased to be larger than the normally generated torque that corresponds to the current operating conditions of the engine 10. Consequently, backward or negative variations in the acceleration in the running direction of the vehicle can be effectively reduced, and vibration upon acceleration can be effectively suppressed.

By increasing the generated torque to be larger than the normally generated torque during variable torque control, a reduction in the average torque generated by the engine 10 during the control can be favorably limited or avoided, and the acceleration performance of the vehicle can be kept at a high level even during variable torque control.

The rate or degree of an increase in the throttle opening amount that is controlled to be larger than the opening amount originally determined based on the operating conditions of the engine 10 is kept at the same level for a certain period of time from the start of the variable torque control, and then gradually reduced until the controlled throttle opening amount matches the original opening amount. Thus, the variable torque control can smoothly switch over to normal control.

Furthermore, the rate of variation in the generated torque relative to a variation in the engine speed is reduced after a certain period of time elapses from the start of the variable torque control. With this arrangement, the variable torque control can be smoothly faded away, and then finished at an appropriate point in time.

In the illustrated embodiment, the ECU 20 determines that the engine 10 has been brought into an acceleration operating state, based on a difference between the steady-state air flow rate "klta" and the transient air flow rate "klcrt", which corresponds to an amount of a response delay of the intake air flow rate relative to a change in the throttle opening amount. This makes it possible to quickly start variable torque control with an appropriate timing. Other methods may be employed for determining that the engine 10 has been brought into an acceleration operating state, and other parameters may be used for detecting the accelerating state of the engine 10. For example, the accelerating state of the engine 10 maybe detected by detecting changes in the throttle opening amount or accelerator pedal position, or changes in measurement values of the intake air flow rate detected by the air flow meter 23, or the like.

The amount of a response delay relative to a change in the throttle opening amount may be obtained from a parameter other than a difference between the steady-state air flow rate "klta" and the transient air flow rate "klcrt". For example, the intake air flow rate detected by the air flow meter 23 also involves some degree of response delay relative to the actual intake air flow rate. In view of this, the accelerating state of the engine 10 may be determined using an estimated value that corresponds to a measurement value of the intake air flow rate by the air flow meter 23, or a measurement value calculated based on the throttle opening amount.

In the illustrated embodiment, after a certain period of time elapses from the start of the variable torque control, the rate of variation in the generated torque (target torque variation rate "rtq") with respect to a variation "dlne" in the engine speed is controlled to be gradually reduced. Furthermore, the rate of an increase in the throttle opening amount (final target throttle opening amount "tangle") is controlled to be reduced after a certain period of time elapses from the start of the control. These controls may be performed as needed or desired. Namely, even if these controls are not performed, the generated torque may be increased to be larger than the normally generated torque corresponding to the operating state of the engine 10 under variable torque control, and vibration upon acceleration of the vehicle can be effectively suppressed.

In the illustrated embodiment, the varying accelerating state of the vehicle during acceleration are grasped or determined based on variations "dlne" in the engine speed after the engine 10 has been brought into an acceleration operating state. It is, however, possible to determine the varying accelerating state of the vehicle using other methods, for example, on the basis of the result of detection of an acceleration sensor for detecting the acceleration of the vehicle, or changes in the vehicle speed.

In the illustrated embodiment, the controller (ECU 20) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 2, 5 and 6 can be used as the controller. A distributed processing architecture can be used for maximum data/signal processing capability and speed.

While the invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control apparatus of an internal combustion engine installed on a motor vehicle, comprising a controller that:
   determines when the engine is in an acceleration operating state in which vibration occurs,
   controls an output of the engine when the engine is determined to be in the acceleration operating state in a manner so as to reduce the vibration of the vehicle at the time of acceleration of the vehicle by making a generated torque of the internal combustion engine fluctuate by controlling an ignition timing of the engine; and
   during a period of time in which the engine is determined to be in the acceleration operating state, the controller controls an opening amount of a throttle valve provided in the engine so that the opening amount is set to a second opening amount that is larger than a first opening amount to which the opening amount would be set if the controller had not determined that the engine was in the acceleration operating state.

2. A control apparatus according to claim 1, wherein the controller gradually reduces the opening amount of the throttle valve from the second opening amount toward the first opening amount while the engine is determined to be in the acceleration operating state.

3. A control apparatus according to claim 2, wherein the controller holds the opening amount of the throttle valve at the second opening amount for a predetermined period of time before it gradually reduces the opening amount toward the first opening amount.

4. A control apparatus according to claim 1, wherein the controller determines that the engine is in the acceleration operating state based on a flow rate of intake air that is introduced into a combustion chamber of the engine.

5. A control apparatus according to claim 1, wherein the controller determines that the engine is in the acceleration operating state based on a rotating speed of the engine.

6. A control apparatus according to claim 1, wherein the controller determines that the engine is in the acceleration operating state based on an acceleration of the motor vehicle on which the engine is installed.

7. A control method of an internal combustion engine installed on a motor vehicle, comprising:
   determining when the engine is in an acceleration operating state in which vibration occurs;
   controlling an output of the engine when the engine is determined to be in the acceleration operating state in a manner so as to reduce the vibration of the vehicle at the time of acceleration of the vehicle by making a generated torque of the internal combustion engine fluctuate by controlling an ignition timing of the engine; and
   during a period of time in which the engine is determined to be in the acceleration operating state, controlling an opening amount of the throttle valve provided in the engine so that the opening amount is set to a second opening amount that is larger than a first opening amount to which the opening amount would be set if the engine has not been determined to be in the acceleration operating state.

8. A control method according to claim 7, further comprising:

gradually reducing the opening amount of the throttle valve from the second opening amount toward the first opening amount while the engine is determined to be in the acceleration operating state.

9. A control method according to claim 8, further comprising:

holding the opening amount of the throttle valve at the second opening amount for a predetermined period of time prior to gradually reducing the opening amount toward the first opening amount.

10. A control method according to claim 7, wherein the acceleration operating state of the engine is determined based on a flow rate of intake air that is introduced into a combustion chamber of the engine.

11. A control method according to claim 7, wherein the acceleration operating state of the engine is determined based on a rotating speed of the engine.

12. A control method according to claim 7, wherein the acceleration operating state the engine is determined based on an acceleration of the motor vehicle on which the engine is installed.

* * * * *